(12) United States Patent  
Yelamos Ruiz et al.

(10) Patent No.: US 11,581,832 B2  
(45) Date of Patent: Feb. 14, 2023

(54) MOTOR WINDING MONITORING AND SWITCHING CONTROL

(71) Applicant: Infineon Technologies Austria AG, Villach (AT)

(72) Inventors: Pablo Yelamos Ruiz, Hermosa Beach, CA (US); Tao Zhao, Redondo Beach, CA (US)

(73) Assignee: Infineon Technologies Austria AG, Villach (AT)

( * ) Notice: Subject to any disclaimer, the term of this patent is extended or adjusted under 35 U.S.C. 154(b) by 0 days.

(21) Appl. No.: 17/181,150

(22) Filed: Feb. 22, 2021

(65) Prior Publication Data

US 2022/0271692 A1    Aug. 25, 2022

(51) Int. Cl.  
*H02P 6/10* (2006.01)

(52) U.S. Cl.  
CPC ..................................... *H02P 6/10* (2013.01)

(58) Field of Classification Search  
CPC .... H02P 6/10; H02P 29/027; H02P 2006/045; H02P 6/28; H02P 29/032; H02H 3/027; H02H 3/093; H02H 3/08; H02H 7/08  
See application file for complete search history.

(56) References Cited

U.S. PATENT DOCUMENTS

| | | | |
|---|---|---|---|
| 8,063,591 B2* | 11/2011 | Yamamoto | B60R 21/017 318/280 |
| 8,633,664 B2* | 1/2014 | Endoh | B62D 5/0487 318/400.22 |
| 8,816,614 B2* | 8/2014 | Barth | H02P 8/12 318/278 |
| 9,742,319 B2* | 8/2017 | Marvelly | H02P 6/153 |
| 2009/0066280 A1* | 3/2009 | Hayashi | H02P 7/29 318/430 |
| 2012/0194114 A1* | 8/2012 | Ito | H02P 7/285 318/434 |
| 2013/0083434 A1 | 4/2013 | Barth | |

(Continued)

FOREIGN PATENT DOCUMENTS

| | | | |
|---|---|---|---|
| EP | 3605834 A1 | 2/2020 | |
| GB | 2469129 A | 10/2010 | |
| WO | WO-2019034212 A1 * | 2/2019 | .............. H02P 8/32 |

OTHER PUBLICATIONS

Extended European Search Report, EP 22157966.7, dated Jul. 12, 2022, pp. 1-9.

(Continued)

*Primary Examiner* — Bickey Dhakal  
(74) *Attorney, Agent, or Firm* — Armis IP Law, LLC

(57) ABSTRACT

An apparatus includes a controller. To control current through a motor winding, the controller monitors a magnitude of current supplied through the motor winding. The controller compares the magnitude of current to a threshold value. In response to detecting that the magnitude of current crosses the threshold value, the controller terminates a flow of the current through the motor winding. In one application, termination of the current through the motor winding supports more efficient use of energy to drive the motor winding. For example, via the controller, terminating the current through the motor winding to prevent the current from flowing in a reverse direction through the motor winding.

33 Claims, 16 Drawing Sheets

(56) References Cited

U.S. PATENT DOCUMENTS

| | | | |
|---|---|---|---|
| 2014/0265987 A1* | 9/2014 | Chretien | H02M 5/458 |
| | | | 318/494 |
| 2018/0262148 A1* | 9/2018 | Endo | H02H 3/0935 |
| 2019/0260327 A1* | 8/2019 | Furukawa | H02P 21/22 |
| 2020/0055542 A1* | 2/2020 | Yamamoto | B62D 5/0481 |
| 2020/0221611 A1* | 7/2020 | Kobayashi | H05K 7/20936 |
| 2020/0295684 A1* | 9/2020 | Hashimoto | H02P 6/182 |

OTHER PUBLICATIONS

Fang, et al., "Precise Accelerated Torque Control for Small Inductance Brushless DC Motor", IEEE Transactions on Power Electronics; vol. 28, No. 3, Mar. 1, 2013, pp. 1400-1412, XP055173650.

* cited by examiner

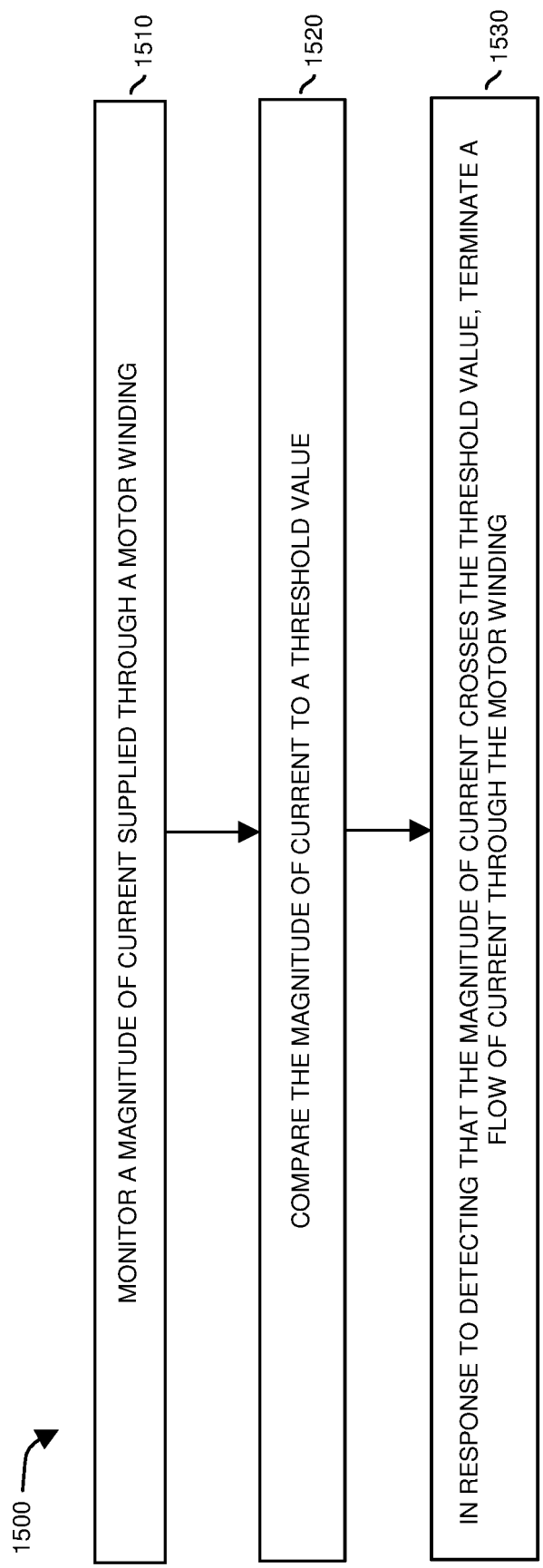

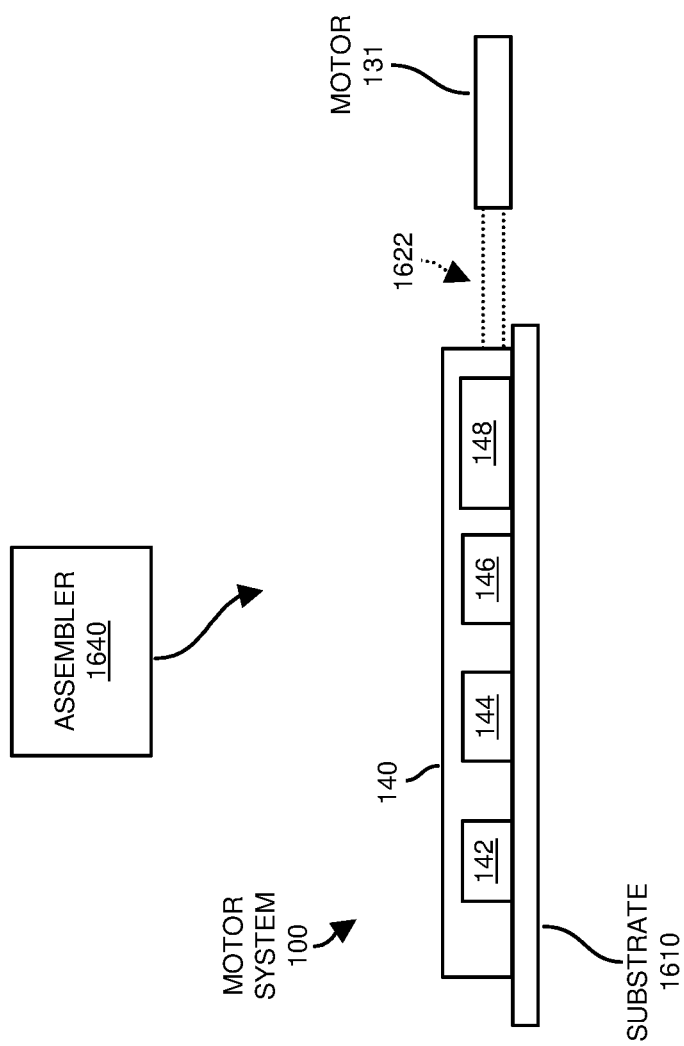

MOTOR WINDING MONITORING AND SWITCHING CONTROL

BACKGROUND

One of the most common trends in motor drive systems (such as robotics or servo drives and power tool brushless DC motor) is the reduction of the motor inductance (phase inductance). This is even more accentuated in 'slotless' motors (typically 25% of the inductance of a standard motor). Implementation of low inductance motor windings provide several benefits such as higher speed capability, better dynamics, and potentially more compact motor size.

The reduction of inductance in the motor winding however has the disadvantage that the so-called current ripple associated with driving the respective motor increases. In such an instance, such as especially when the motor load is low, this creates a situation in which the motor current through the respective winding reverses, becoming negative when a respective low side switch is activated (assuming high side and low side PWM are complementary with dead time insertion as most drives systems are).

During a condition in which the motor winding current reverses its direction as previously discussed, so does the corresponding generated magnetic flux. This temporary current reversal results in a so-called 'braking' effect, which has undesirable consequences. For example, reversal of motor winding current can result in motor braking, reduced motor speed, loss of control, ripple, and similar effects in torque and position.

Some motor manufacturers suggest including supplemental artificial inductance in series with a respective motor winding (motor phase) to prevent the braking effect. However, this defeats the advantages of a low inductance motor.

BRIEF DESCRIPTION

Implementation and use of clean energy (or green technology) is very important to reduce our impact as humans on the environment. In general, clean energy includes any evolving methods and materials to reduce an overall toxicity on the environment from energy consumption.

This disclosure includes the observation that raw energy, such as received from green energy sources or non-green energy sources, typically needs to be converted into an appropriate form (such as desired AC voltage, DC voltage, etc.) before it can be used to power end devices such as servers, computers, mobile communication devices, wireless base stations, etc. After conversion, the energy is used to perform a respective function such as drive one or more windings of a motor. Regardless of whether energy is received from green energy sources or non-green energy sources, it is desirable to make most efficient use of the energy (such as storage and subsequent distribution and use) provided by such systems to reduce our impact on the environment. This disclosure and novel ideas contribute to reducing our carbon footprint based on more efficient use of energy.

Embodiments herein include novel ways of improving control and efficiency of driving one or more windings of a motor.

More specifically, embodiments herein include an apparatus and/or system including a controller such as a motor controller that controls current through one or more motor windings. In one embodiment, the controller monitors a magnitude of current supplied through a motor winding of the motor. The controller compares the magnitude of current to a threshold value. In response to detecting that the magnitude of current crosses the threshold value, the controller terminates a flow of the current through the motor winding.

In one embodiment, termination of the current through the motor winding supports more efficient use of energy to drive motor winding. For example, one embodiment herein includes, via the controller, terminating the current through the motor winding to prevent the current from flowing in a reverse direction through the motor winding.

In accordance with further example embodiments, the controller controls the flow of current through the motor winding via multiple switches. Via control of the switches, the controller couples the motor winding to a different reference voltages. Application of the different reference voltages to a node of the motor winding causes a magnitude of the current through the winding to vary over time, resulting in rotation of a corresponding motor shaft of the motor. In one embodiment, the termination of the flow of current through the motor winding includes deactivation of low side switch circuitry electrically connecting the motor winding to a (ground) reference voltage.

Note that the threshold value as discussed herein can be set to any suitable value. In one embodiment, the threshold value at which the controller terminates the current through the winding corresponds to substantially zero amperes of current flowing through the motor winding. Further embodiments herein include, via the controller, terminating the flow of current through the motor winding as the magnitude of the current supplied through the motor winding is decreasing towards zero.

In further example embodiments, the controller controls multiple switches to control current through the motor winding. For example, the controller activates a first switch coupled to the motor winding to increase the magnitude of the current though the motor winding. Later, during the control cycle, the controller activates a second switch coupled to the motor winding to decrease the magnitude of the current through the motor winding. In one embodiment, to prevent the magnitude of the motor winding current from reversing or dropping to less than zero, the controller deactivates both the first switch and the second switch to terminate the flow of current in response to detecting a condition in which a magnitude of the current through the motor winding crosses the threshold value.

Further embodiments herein include, via the controller, adjusting a switching frequency of controlling the flow of current through the motor winding responsive to detection of a condition in which the magnitude of the current through the motor winding crosses the threshold value. In one embodiment, via activation of a high side switch circuitry, the controller initiates an increase in the flow of current through the motor winding again subsequent to the termination of the flow of current.

Further embodiments herein include implementing the controller as a switch driver. In such an instance, the switch driver receives a pulse width modulation control signal indicating a control state to apply to a switch that controls the flow of current through the motor winding. In a manner as previously discussed, the switch driver implementing control functions monitors the magnitude of motor winding current and adjusts the received pulse width modulation control signal based on the comparison of the magnitude of current to the threshold value. In one embodiment, the switch driver adjustment implemented by the switch driver prevents the magnitude of the current though the motor winding from falling below the threshold value.

In still further example embodiments, the controller controls a flow of current through each of multiple motor windings of the motor. For example, the controller monitors first current flowing through a first motor winding; the controller monitors second current through a second motor winding; the controller monitors third current through a third motor winding; and so on. The controller compares the first current to the threshold value; the controller compares the second current to the threshold value; the controller compares the third current to the threshold value; and so on. The controller prevents each of the currents from falling below a threshold value. For example, in response to detecting that the magnitude of first current through the first motor winding crosses (such as equals or falls below) the threshold value, the controller terminates a flow of the first current through the first motor winding; in response to detecting that the magnitude of second current through the second motor winding crosses (such as equals or falls below) the threshold value, the controller terminates a flow of the second current through the second motor winding; in response to detecting that the magnitude of third current through the third motor winding crosses (such as equals or falls below) the threshold value, the controller terminates a flow of the third current through the third motor winding; and so on.

As previously discussed, in one embodiment, the respective magnitude of current through each of the motor windings varies over time. Additionally, or alternatively, each of the respective magnitudes of current supplied to the motor windings is out of phase with respect to each other.

Still further embodiments herein include, via the controller, varying a switching frequency associated with producing a respective current supplied to a corresponding motor winding. The switching frequency controls a respective frequency of ripple current associated with each motor drive current. In accordance with further example embodiments, the controller implements a minimal delay threshold value between a time of terminating the flow of current (as the magnitude of the current decreases to the threshold value) and a subsequent time of increasing the magnitude of current supplied through the motor winding above the threshold value. Preventing the switching period of switching the motor winding current below the minimum delay time prevents the controller from increasing the respective switching frequency above a frequency threshold value.

As previously discussed, embodiments herein are useful over conventional techniques. For example, embodiments herein prevent current reversal in one or more motor windings, resulting in more efficient use of power to control rotation of a respective motor shaft and load.

These and other more specific embodiments are disclosed in more detail below.

Note that although embodiments as discussed herein are applicable to motor control, the concepts disclosed herein may be advantageously applied to any other suitable topologies as well as general power supply control applications.

Note that any of the resources as discussed herein can include one or more computerized devices, mobile communication devices, servers, base stations, wireless communication equipment, communication management systems, workstations, user equipment, handheld or laptop computers, or the like to carry out and/or support any or all of the method operations disclosed herein. In other words, one or more computerized devices or processors can be programmed and/or configured to operate as explained herein to carry out the different embodiments as described herein.

Yet other embodiments herein include software programs to perform the steps and operations summarized above and disclosed in detail below. One such embodiment comprises a computer program product including a non-transitory computer-readable storage medium (i.e., any computer readable hardware storage medium) on which software instructions are encoded for subsequent execution. The instructions, when executed in a computerized device (hardware) having a processor, program and/or cause the processor (hardware) to perform the operations disclosed herein. Such arrangements are typically provided as software, code, instructions, and/or other data (e.g., data structures) arranged or encoded on a non-transitory computer readable storage medium such as an optical medium (e.g., CD-ROM), floppy disk, hard disk, memory stick, memory device, etc., or other a medium such as firmware in one or more ROM, RAM, PROM, etc., or as an Application Specific Integrated Circuit (ASIC), etc. The software or firmware or other such configurations can be installed onto a computerized device to cause the computerized device to perform the techniques explained herein.

Accordingly, embodiments herein are directed to methods, systems, computer program products, etc., that support operations as discussed herein.

One embodiment herein includes a computer readable storage medium and/or system having instructions stored thereon. The instructions, when executed by computer processor hardware, cause the computer processor hardware (such as one or more co-located or disparately located processor devices) to: monitor a magnitude of current supplied through a motor winding; compare the magnitude of current to a threshold value; and in response to detecting that the magnitude of current crosses the threshold value, terminate a flow of current through the motor winding.

The ordering of the steps above has been added for clarity sake. Note that any of the processing operations as discussed herein can be performed in any suitable order.

Other embodiments of the present disclosure include software programs and/or respective hardware to perform any of the method embodiment steps and operations summarized above and disclosed in detail below.

It is to be understood that the system, method, apparatus, instructions on computer readable storage media, etc., as discussed herein also can be embodied strictly as a software program, firmware, as a hybrid of software, hardware and/or firmware, or as hardware alone such as within a processor (hardware or software), or within an operating system or a within a software application.

As discussed herein, techniques herein are well suited for use in the field of implementing one or more inductor components to deliver current to a load. However, it should be noted that embodiments herein are not limited to use in such applications and that the techniques discussed herein are well suited for other applications as well.

Additionally, note that although each of the different features, techniques, configurations, etc., herein may be discussed in different places of this disclosure, it is intended, where suitable, that each of the concepts can optionally be executed independently of each other or in combination with each other. Accordingly, the one or more present inventions as described herein can be embodied and viewed in many different ways.

Also, note that this preliminary discussion of embodiments herein (BRIEF DESCRIPTION OF EMBODIMENTS) purposefully does not specify every embodiment and/or incrementally novel aspect of the present disclosure or claimed invention(s). Instead, this brief description only presents general embodiments and corresponding points of novelty over conventional techniques. For additional details

BRIEF DESCRIPTION OF THE DRAWINGS

FIG. 15 is an example diagram illustrating a method according to embodiments herein.

FIG. 16 is an example diagram illustrating assembly of a circuit according to embodiments herein.

Figure 1:
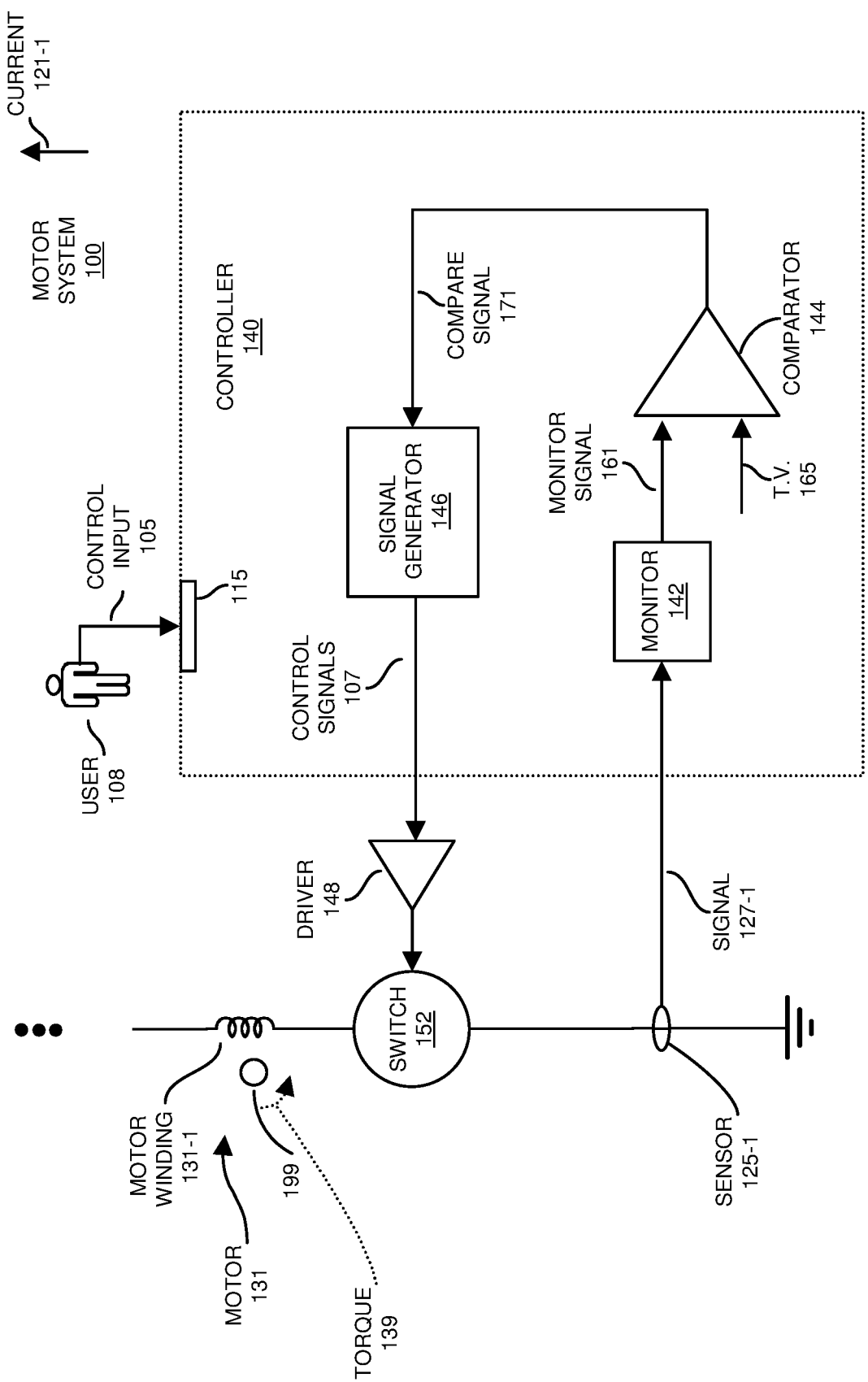
FIG. 1 is an example general diagram of a motor control system according to embodiments herein.

The foregoing and other objects, features, and advantages of the invention will be apparent from the following more particular description of preferred embodiments herein, as illustrated in the accompanying drawings in which like reference characters refer to the same parts throughout the different views. The drawings are not necessarily to scale, with emphasis instead being placed upon illustrating the embodiments, principles, concepts, etc.

DETAILED DESCRIPTION

One embodiment herein includes a motor winding controller. In order to control current through a motor winding, the controller monitors a magnitude of current supplied through the motor winding. The controller compares the magnitude of current to a threshold value. In response to detecting that the magnitude of current crosses the threshold value, the controller terminates a flow of the current through the motor winding. In one application, termination of the current through the motor winding supports more efficient use of energy to drive the motor winding. For example, via the controller, terminating the current through the motor winding prevents the current from flowing in a reverse direction through the motor winding. The controller implements the above control function for each of multiple windings in the motor.

Now, more specifically, FIG. 1 is an example general diagram of a motor control system according to embodiments herein.

In this example embodiment, the motor system 100 of FIG. 1 includes a controller 140, driver 148, switch 152, and motor winding 131-1. Controller 140 includes monitor 142, comparator 144, and signal generator 146.

In this example embodiment, the controller 140 such as a motor controller controls current 121-1 through the respective motor winding 131-1.

For example, the user operating motor system 100 such as a power tool produces control input 105. The control input 105 supplied to the controller 140 via control input interface 115 (such as a power tool trigger device controlled via user 108) indicates any suitable control information such as a speed at which to rotate the shaft 148 of a motor 131, direction of the shaft of the motor 131, etc.

In one embodiment, as indicated by the control input 105, the controller 140 controls current 121-1 through the motor winding 131-1 (and potentially additional windings as further discussed herein) to control the rotation of the shaft 199 associated with the motor 131.

More specifically, in one embodiment, via monitor 142, the controller 140 monitors a magnitude of current 121-1 supplied through the motor winding 131-1. Sensor 125-1 generates signal 127-1 indicating a magnitude of the current 121-1 through the motor winding 131-1.

The monitor 142 (such as including one or more components such as amplifier, analog-to-digital converter, etc.) receives the signal 127-1 and produces monitor signal 161 indicating a magnitude and/or polarity of current 121-1 supplied through the winding 131-1.

As further shown, via comparator 144, the controller 140 compares the magnitude of current 121-1 as indicated by the monitor signal 161 to a threshold value 165. The threshold value 165 can be any suitable value. In one embodiment, the threshold value 165 indicates a zero crossing condition (trigger condition) in which the magnitude of current 121-1 through the winding 131-1 is substantially zero amperes or other suitable value.

In response to detecting that the magnitude of current 121-1 crosses (such as is equal to or less than) the threshold value 165, via signal generator 146, the controller 140 terminates a flow of the current 121-1 through the motor winding 131-1. In one embodiment, this includes producing control signals 107 to deactivate the switch 152. For example, driver 148 receives the control signals 107 and shuts off switch 152, preventing current 121-1 from flowing through the motor winding 131-1 in response to the trigger condition.

In one embodiment, termination of the current 121-1 through the motor winding 131-1 supports more efficient use of energy to drive the motor winding 131-1. For example, one embodiment herein includes, via the controller 140, terminating the current 121-1 through the motor winding 131-1 to prevent the current 121-1 from flowing in a reverse direction through the motor winding 131-1.

In further example embodiments, as previously discussed, the current 121-1 through the winding 131-1 results in application of torque 139 to a respective motor shaft 199 of motor 131. Current flow in a first direction through the winding 121-1 causes the shaft 199 of motor 131 to rotate in a first rotational direction; current flow in a second direction through the winding 121-1 eventually causes the shaft to rotate in a second direction or at least slows down the motor shaft 199 from flowing in the first direction.

Figure 2:
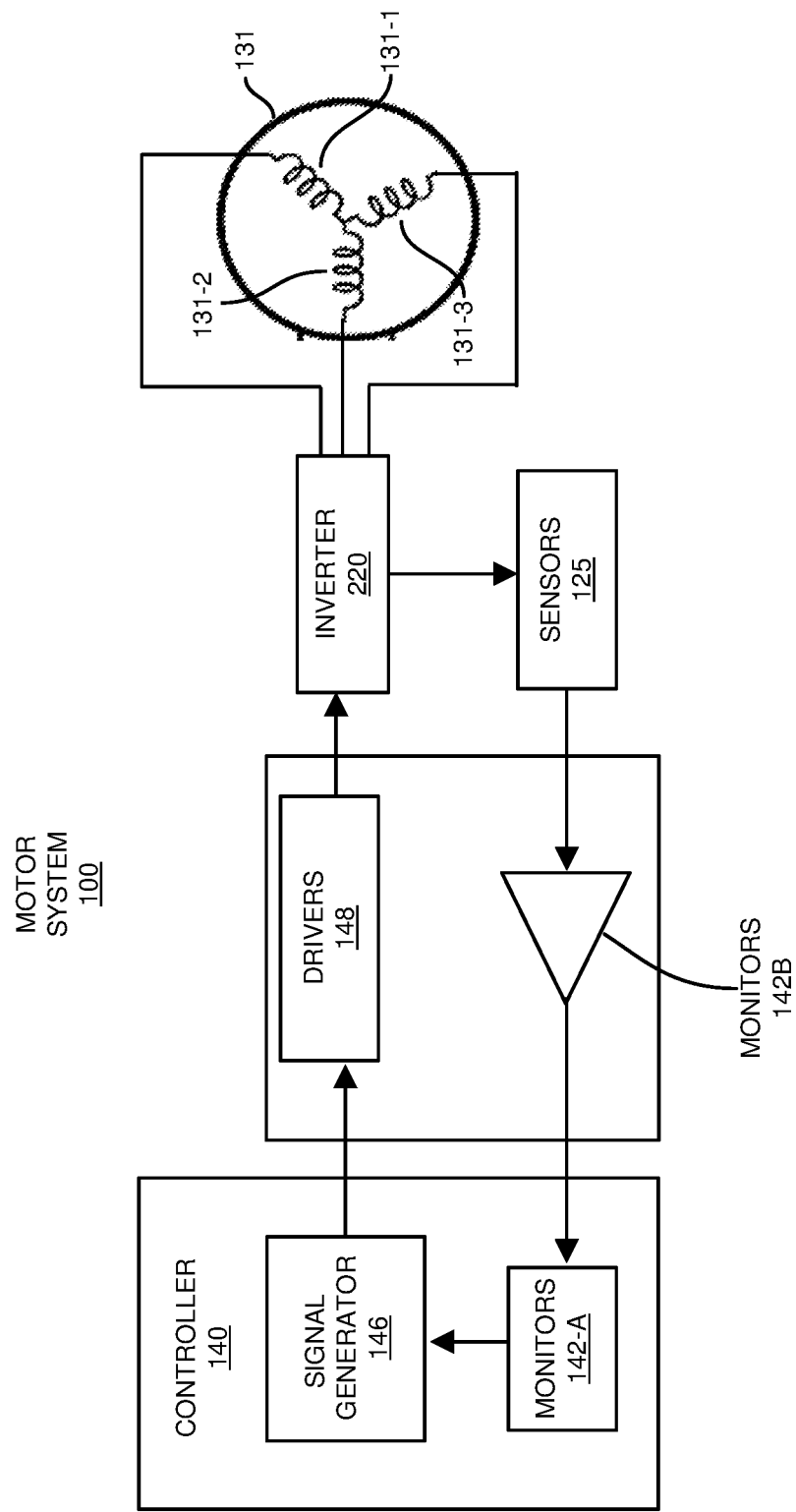
FIG. 2 is an example diagram illustrating a motor control system according to embodiments herein.

FIG. 2 is an example diagram illustrating a motor control system according to embodiments herein.

In this example embodiment, the motor system 100 includes components as previously discussed with respect to FIG. 1. However, the motor system 100 in FIG. 2 also includes implementation of a so-called inverter 220. In one embodiment, the inverter 220 includes multiple switches to control a flow of current through the windings 131-1, 131-2, and 131-3 of motor 131.

As further discussed below, during operation, the inverter 220 controls flow of currents through each of the multiple motor windings as more particularly shown in FIG. 3.

Figure 3:
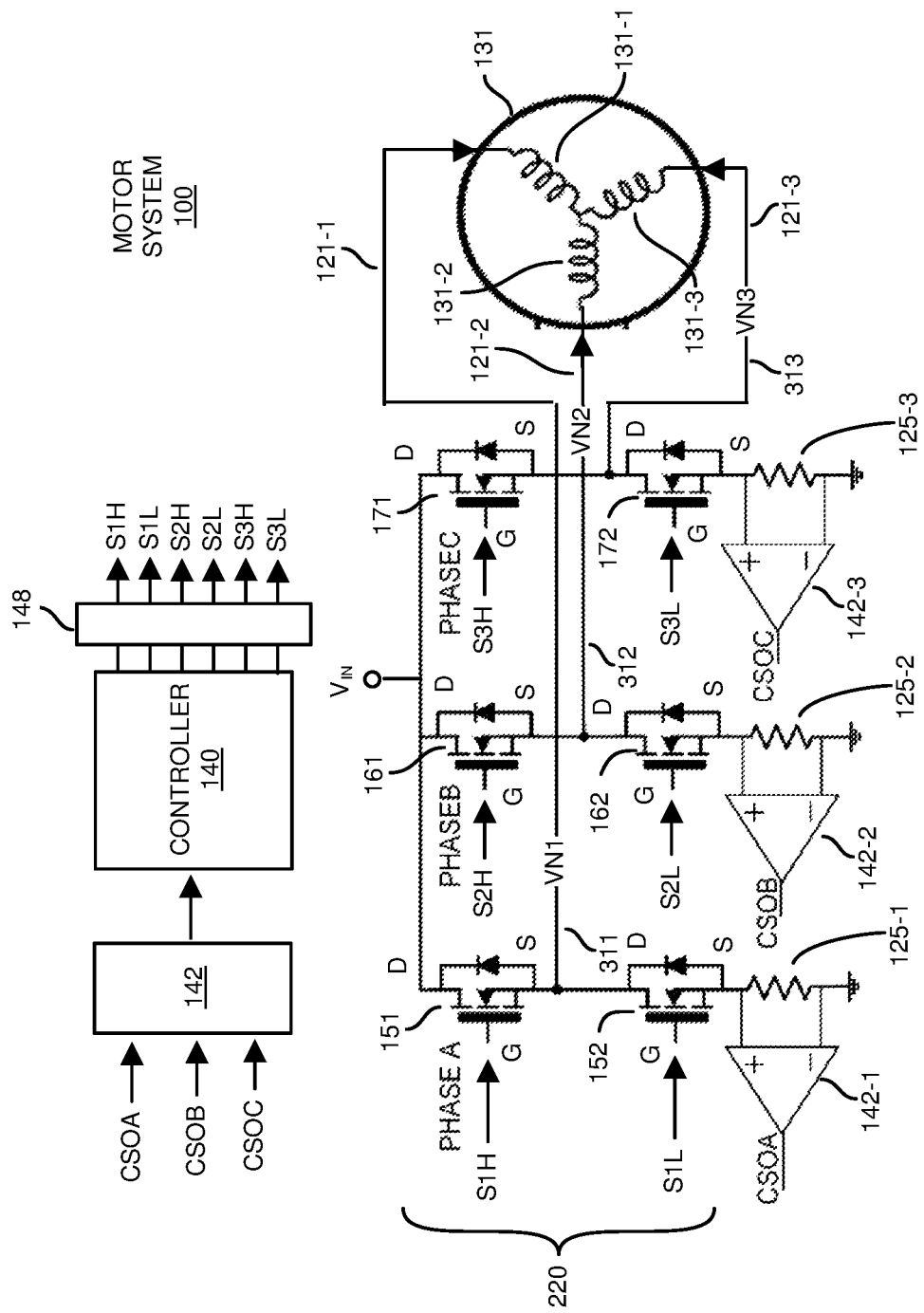
FIG. 3 is an example diagram illustrating monitoring and control of current through multiple motor windings according to embodiments herein.

FIG. 3 is an example diagram illustrating monitoring and control of current through multiple motor windings according to embodiments herein.

In this example embodiment, the motor system 100 includes inverter 220 as well as a sensor and amplifier associated with each monitored winding.

For example, inverter 220 includes switches 151, 152, 161, 162, 171, and 172. Motor system further includes amplifier 142-1, amplifier 142-2, amplifier 142-3, sensor 125-1, sensor 125-2, and sensor 125-3.

In this example embodiment, the drain of switch 151 is connected to the input voltage Vin; the source node of switch 151 is connected to the drain node of switch 152; the source node of switch 152 is connected to the sensor 125-1. The components including switch 151, switch 152, and sensor 125-1 are connected in series between the input voltage Vin and the ground reference voltage. Yet further, the non-inverting input of amplifier 142-1 is connected to a first node of the sensor 125-1; the inverting input of amplifier 142-1 is connected to a second node of the sensor 125-1. In one embodiment, the sensor 125-1 is a resistor, although the sensor 125-1 can be any suitable type of component whose voltage varies depending on an amount of current flowing through it. Current through the sensor 125-1 produces a respective voltage that is amplified by the amplifier 142-1 to produce the signal CSOA supplied to the monitor 142. As previously discussed, monitor 142 provides signals to the controller 140 regarding comparison of a respective winding current to a threshold value 165.

As further shown, the drain of switch 161 is connected to the input voltage Vin; the source node of switch 161 is connected to the drain node of switch 162; the source node of switch 162 is connected to the sensor 125-2. The components including switch 161, switch 162, and sensor 125-2 are connected in series between the input voltage Vin and the ground reference voltage. The non-inverting input of amplifier 142-2 is connected to a first node of the sensor 125-2; the inverting input of amplifier 142-2 is connected to a second node of the sensor 125-2. In one embodiment, the sensor 125-2 is a resistor, although the sensor 125-2 can be any suitable component. Current through the sensor 125-2 produces a respective voltage that is amplified by the amplifier 142-2 to produce the signal CSOB supplied to the monitor 142.

The drain of switch 171 is connected to the input voltage Vin; the source node of switch 171 is connected to the drain node of switch 172; the source node of switch 172 is connected to the sensor 125-3. The components including switch 171, switch 172, and sensor 125-3 are connected in series between the input voltage Vin and the ground reference voltage. The noninverting input of amplifier 142-3 is connected to a first node of the sensor 125-3; the inverting input of amplifier 142-3 is connected to a second node of the sensor 125-3. In one embodiment, the sensor 125-3 is a resistor, although the sensor 125-3 can be any suitable component. Current through the sensor 125-3 produces a respective voltage that is amplified by the amplifier 142-3 to produce the signal CSOB supplied to the monitor 142.

Thus, when a respective high-side switch 151 is activated via signal S1H, the winding current 121-1 flows through the respective high-side switch and corresponding winding 131-1. After deactivation of the high side switch 151 via signal S1H, the controller 140 controls activation of the low-side switch via signal S1L. A respective amplifier in the low-side switch 152 path amplifies the detected signal sensed by the sensor 125-1 and transmits the signal CSOA to monitor 142.

In a manner as previously discussed, controller 140 monitors a magnitude of the winding current 121-1 and prevents it from dropping below a threshold value 165 (corresponding to zero amperes or other suitable value). Each of the windings are controlled out of phase with respect to each other.

In a similar manner, based on a magnitude of the current 121-2 through winding 131-2 and voltage across the sensor 125-2, the amplifier 142-2 produces signal CSOB, which is used at least in part by the controller 140 to generate control signal S2L applied to the gate of switch 162, shutting off switch 162, preventing the current 121-2 from falling below a threshold value 165 (such as corresponding to zero amperes).

Based on a magnitude of the current 121-3 through winding 131-3 and voltage across the sensor 125-3, the amplifier 142-3 produces signal CSOC, which is used at least in part by the controller 140 to generate control signal S3L applied to the gate of switch 172, shutting off switch 172, preventing the current 121-3 from falling below a threshold value 165 (such as corresponding to zero amperes).

Accordingly, in one embodiment, the controller 140 controls the flow of current 121-1 through the motor winding 131-1 via multiple switches 151 and 152. Via control of the switches 151 and 152, the controller 140 couples the motor winding to different reference voltages such as Vin and ground. For example, via activation of switch 151, the controller 140 electrically couples node VN1 of winding 131-1 to the input voltage Vin while switch 152 is deactivated. Via activation of switch 152, the controller 140 electrically couples node VN1 of winding 131-1 to the ground reference voltage while switch 151 is deactivated.

Application of the different reference voltages to the motor winding at different times during a respective control cycle causes a magnitude of the current 121-1 through the winding 131-1 to vary over time, resulting in rotation of a corresponding motor shaft 199. In one embodiment, the termination of the flow of current 121-1 through the motor winding 131-1 includes deactivation of low side switch circuitry (switch 152) electrically connecting the motor winding 131-1 to a (ground) reference voltage.

In a similar manner, the controller 140 controls the flow of current 121-2 through the motor winding 131-2 via multiple switches 161 and 162. Via control of the switches 161 and 162, the controller 140 couples the motor winding to different reference voltages such as Vin and ground. For example, via activation of switch 161, the controller 140 electrically couples node VN2 of winding 131-2 to the input voltage Vin while switch 162 is deactivated. Thereafter, via activation of switch 162, the controller 140 electrically couples node VN2 of winding 131-2 to the ground reference voltage while switch 161 is deactivated.

Application of the different reference voltages to the motor winding at different times during a respective control cycle causes a magnitude of the current 121-2 through the winding 131-2 to vary over time, resulting in rotation of a corresponding motor shaft 199. In one embodiment, the termination of the flow of current 121-2 through the motor winding 131-2 includes deactivation of a low side switch circuitry (switch 162) electrically connecting the motor winding 131-2 to a (ground) reference voltage.

In a similar manner, the controller 140 controls the flow of current 121-3 through the motor winding 131-3 via multiple switches 171 and 172. Via control of the switches 171 and 172, the controller 140 couples the motor winding to different reference voltages such as Vin and ground. For example, via activation of switch 171, the controller 140 electrically couples node VN3 of winding 131-3 to the input voltage Vin while switch 172 is deactivated. Thereafter, via activation of switch 172, the controller 140 electrically couples node VN3 of winding 131-3 to the ground reference voltage while switch 171 is deactivated.

Application of the different reference voltages to the motor winding at different times during a respective control cycle causes a magnitude of the current 121-3 through the winding 131-3 to vary over time, resulting in rotation of a corresponding motor shaft 199. In one embodiment, the termination of the flow of current 121-3 through the motor winding 131-3 includes deactivation of a low side switch circuitry (switch 172) electrically connecting the motor winding 131-3 to a (ground) reference voltage.

Figure 4:
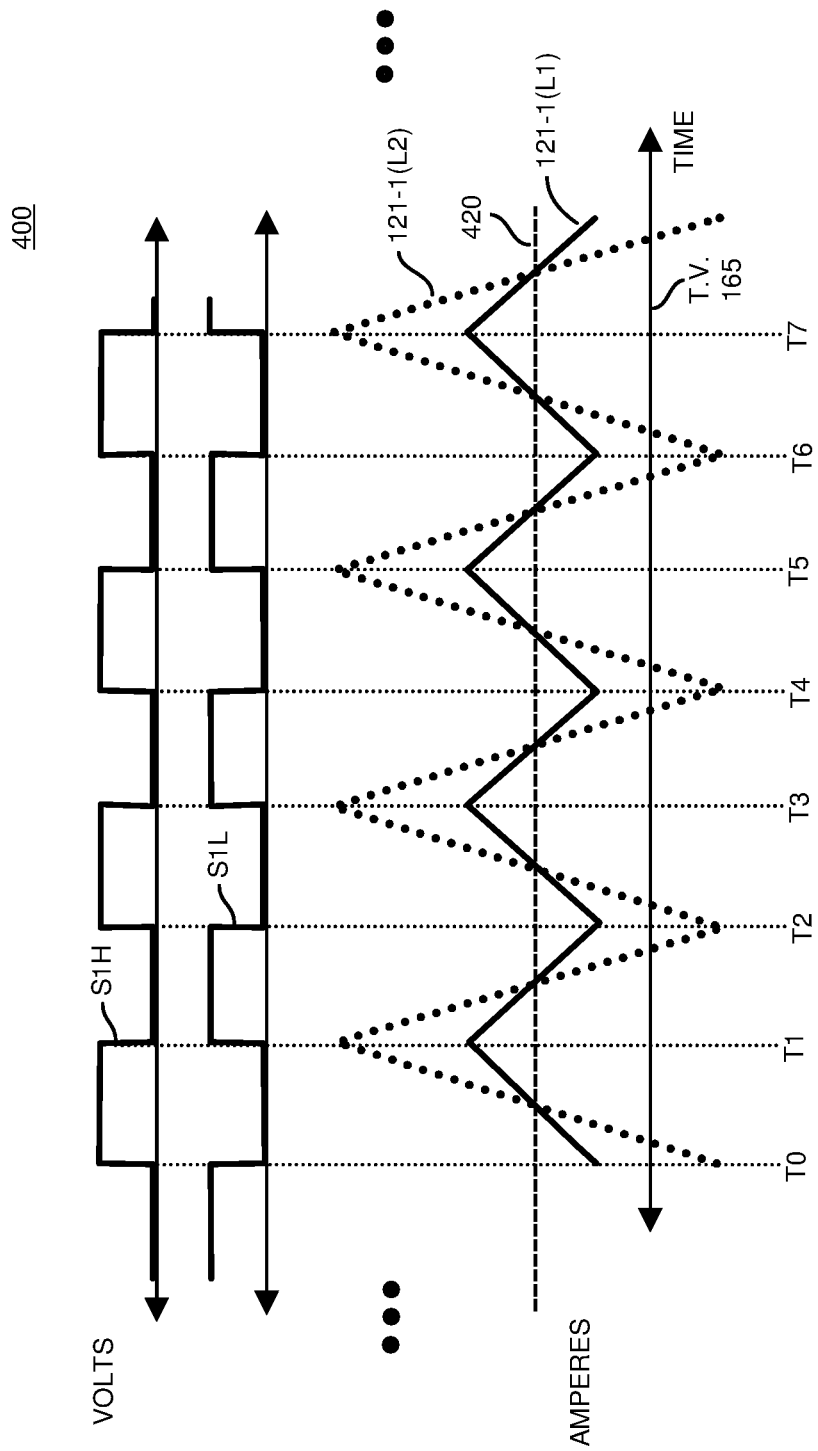
FIG. 4 is an example timing diagram illustrating current through a motor winding at different inductances according to embodiments herein.

FIG. 4 is an example timing diagram illustrating current through a motor winding according to embodiments herein.

In this example embodiment, the controller 140 controls activation of a respective current through the windings of motor 131. The example illustrates two different settings of winding inductances L1 and L2 associated with the winding 131-1, where inductance L2 is less than inductance L1.

More specifically, for a first case when the inductance of the winding 121-1 is L1 (a high inductance), the controller 140 activates high side switch circuitry 151 between time T0 and time T1 while low side switch circuitry 152 is deactivated. Activation of the switch 151 causes the magnitude of the current 121-1(L1) to increase between time T0 and time T1. The controller 140 then deactivates high side switch circuitry 151 between time T1 and time T2 while low side switch circuitry 152 is activated. Activation of the switch 152 causes the magnitude of the current 121-1(L1) to decrease between time T1 and time T2.

The controller 140 switches between activating the high side switch circuitry 151 and low side switch circuitry 152 to produce the current 121-1(L1). The average current 121-1 through winding is shown as current 420. There is no instance of the current 121-1(L1) falling below the threshold value 165.

For a second case when the inductance of the winding 121-1 is L2 (such as a low inductance), where L2 is less than L1, the controller 140 activates high side switch circuitry 151 between time T0 and time T1 while low side switch circuitry 152 is deactivated. Activation of the switch 151 causes the magnitude of the current 121-1(L2) to increase between time T0 and time T1. The controller 140 then deactivates high side switch circuitry 151 between time T1 and time T2 while low side switch circuitry 152 is activated. Activation of the switch 152 causes the magnitude of the current 121-1(L2) to decrease between time T1 and time T2.

The controller 140 switches between activating the high side switch circuitry 151 and low side switch circuitry 152 to produce the current 121-1(L2). The average current 121-1 through winding 131-1 is shown as current 420. In this example embodiment, the low inductance L2 of the winding 131-1 causes the current 121-1(L2) to fall below the threshold value 165 for a portion of each control cycle.

Thus, graph 400 indicates that decreasing a magnitude of the inductance of each of the windings associated with motor 131 makes it more likely that the respective current through each of the windings falls below a respective threshold value 165 for a portion of a respective control cycle.

Figure 5:
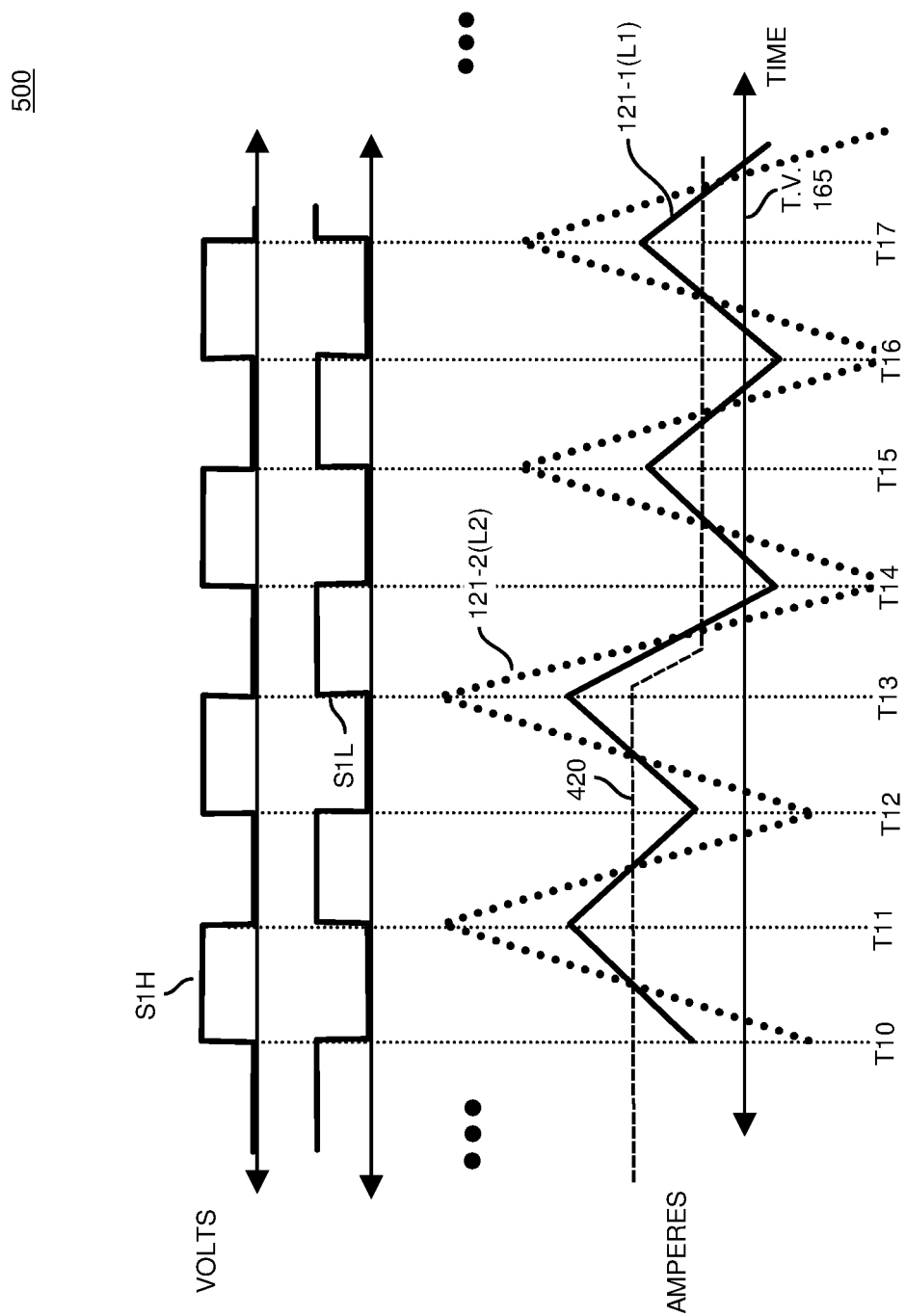
FIG. 5 is an example timing diagram illustrating a change in magnitude of current through a motor winding at different inductances according to embodiments herein.

FIG. 5 is an example timing diagram illustrating current through a motor winding according to embodiments herein.

Graph 500 illustrates the effect of load reduction (between time T13 and time T14) on the motor 131 in both standard inductance (L1) and low inductance (L2) motor windings. Signal 420 represents average current through winding 131-1.

In a similar manner as previously discussed, the controller 140 controls respective switches and variable flow of current 121-1 (ramp of current) through the winding 131-1. Both high inductance L2 instance and low inductance L1 instance of implementing the winding 131-1 result in a change in polarity of current during normal motor switching control operations.

For example, the current 121-1(L1) for winding 131-1 at inductance L1 and the current 121-1(L2) for winding 131-1 at inductance L2 fall below a threshold value 165 after time T13. However, note that the so-called braking effect (such as when the magnitude of the respective winding current 121 falls below the threshold value 165) is magnified or accentuated when motor loading is reduced (i.e., when a lower average current is needed to drive the motor such as occurring between time T13 and time T14). This is another trend in conventional motor drives as applications require both being able to work at full load and at low speed or low torque.

Figure 6:
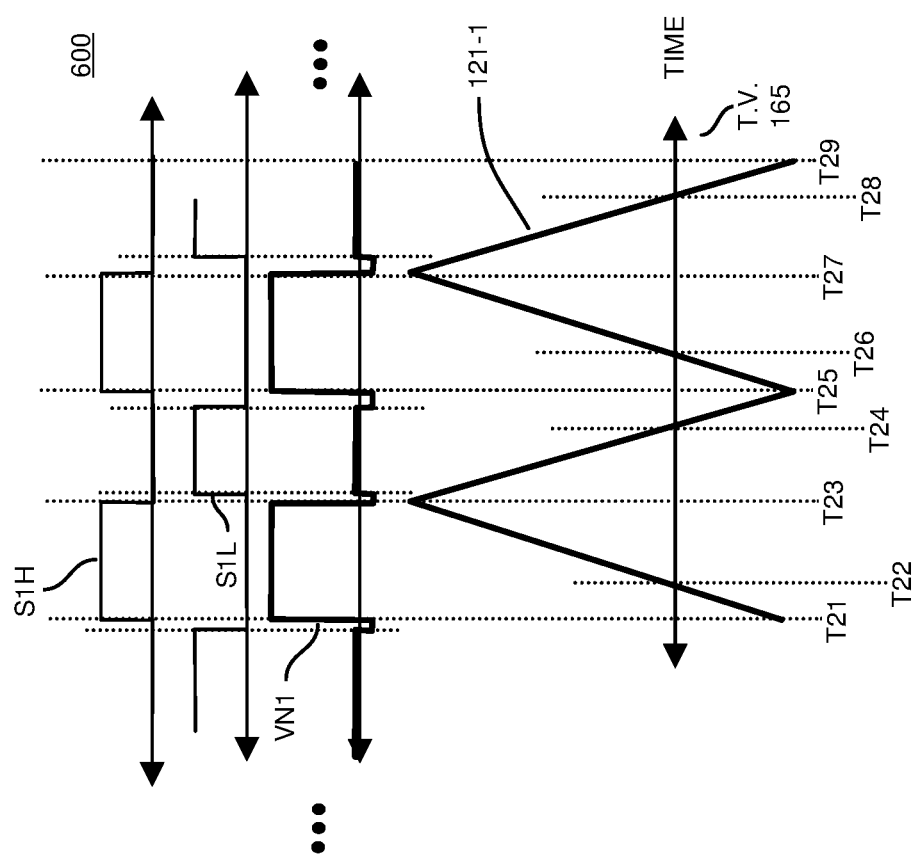
FIG. 6 is an example timing diagram illustrating current through a motor winding according to embodiments herein.

FIG. 6 is an example timing diagram illustrating current through a motor winding according to embodiments herein.

Graph 600 includes detailed waveforms of controlling current through a respective winding. As previously discussed, the controller 140 switches between activating high side switch circuitry and low side switch circuitry with dead time in between. Between time T22 and time T24, the magnitude of current 121-1 is above the threshold value 165. Between time T24 and time T26, the current 121-1 falls below the threshold value 165. Thus, current 121-1 in the motor 131 is mostly positive, but does become negative for a portion of the switching control cycle.

Figure 7:
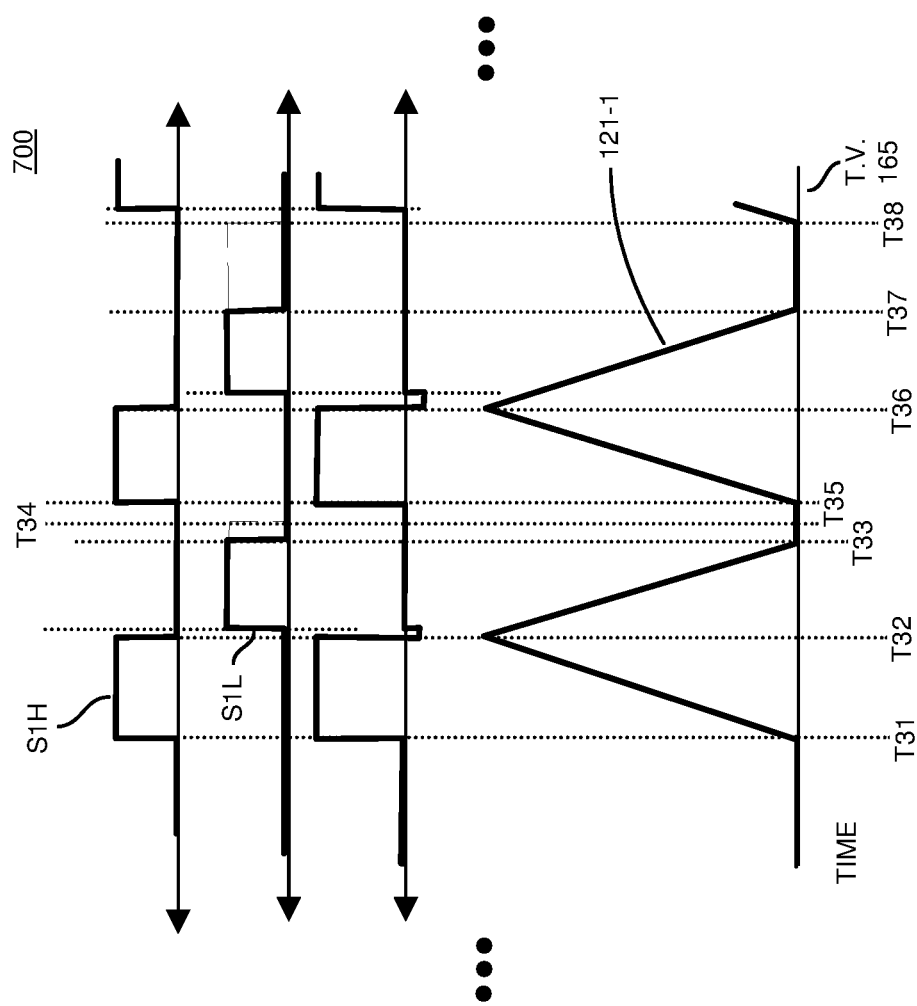
FIG. 7 is an example timing diagram illustrating adjustment of a switching frequency of supplying current to a motor winding according to embodiments herein.

FIG. 7 is an example timing diagram illustrating preventing winding current from falling below a threshold value and adjustment of a switching frequency of supplying current to a motor winding according to embodiments herein.

In a manner as previously discussed, the controller 140 monitors a magnitude of the current 121-1 during a respective control cycle. For example, between time T31 and time T32, the controller activates switch 151, causing a magnitude of the current 121-1 to increase. At or around time T32, after a respective dead time, the controller 140 activates the low side switch 152, resulting in a decrease in the magnitude of the current 121-1 through the winding 131-1. At time T33, in a manner as previously discussed, the controller 140 detects that the magnitude of the current 121-1 crosses the threshold value 165. In such an instance, the controller 140 deactivates the switch 152 at time T33.

Note again that the threshold value 165 can be set to any suitable value. In one embodiment, the threshold value 165 at which the controller 140 terminates the current 121-1 through the winding 131-1 corresponds to substantially zero amperes of current flowing through the motor winding 131. Further embodiments herein include, via the controller 140, terminating the flow of current 121-1 through the motor winding 131-1 as the magnitude of the current 121-1 supplied through the motor winding 131-1 is decreasing towards zero (such as just before time T33). Thus, to prevent the magnitude of the motor winding current 121-1 from reversing or dropping to less than zero (such as threshold value 165), the controller 140 deactivates both the high side switch circuitry 151 and the second switch 152 to terminate the flow of current 121-1.

Further embodiments herein include, via the controller 140, adjusting a switching frequency of controlling the flow of current 121-1 through the motor winding 131-1 responsive to detection of a condition in which the magnitude of the current 121-1 through the motor winding 131-1 crosses the threshold value 165.

In this example embodiment, at time T35 (which occurs subsequent to termination of the current 121-1 at time T33) the controller 140 initiates an increase in the flow of current 121-1 through the motor winding 131-1. The controller 140 decreases the magnitude of current 121-1 between time T36 and time T37 via activation of switch 152. At time T37, the controller 140 deactivates the respective switch 152 to prevent the current 121-1 from falling flow a respective threshold value 165.

The controller 140 delays activating the high side switch circuitry 151 again after time T37 (such as to time T38), decreasing a switching frequency of controls switches 151 and 152. In other words, the time difference between time T33 and time T35 is much less than the time difference between time T37 and time T38.

Accordingly, embodiments herein include, via the controller 140, varying a switching frequency associated with producing a respective current 121-1 supplied to a corresponding motor winding 131-1.

Figure 8:
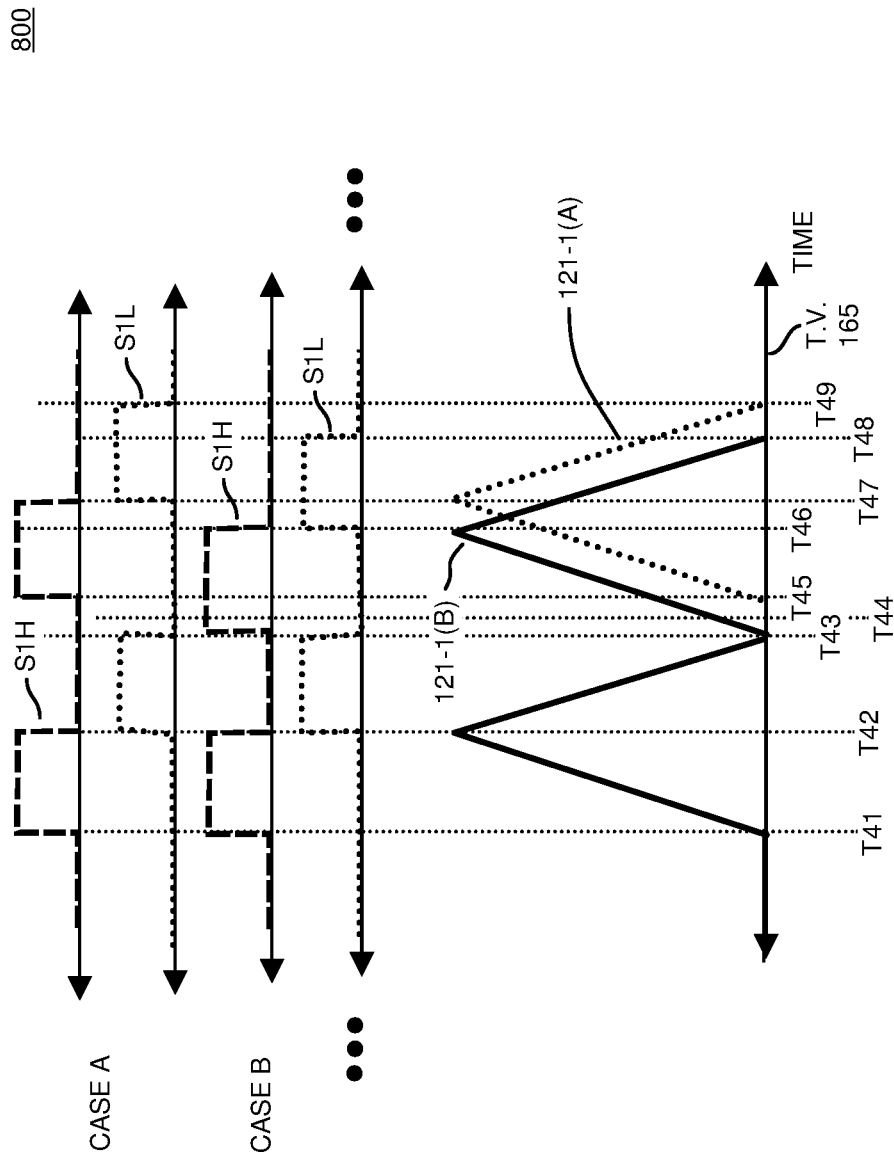
FIG. 8 is an example diagram illustrating adjustment of control signals according to embodiments herein.

FIG. 8 is an example diagram illustrating adjustment of control signals according to embodiments herein.

As previously discussed, embodiments herein include preventing a magnitude of the respective current 121-1 from falling below a respective threshold value 165. This can cause a respective gap (such as between time T43 and time T45) in which neither the high side switch nor the low side switch is activated. Thus according to case A, and application of corresponding control signals S1H and S1L, the current 121-1(A) through winding 131-1 experiences a gap time of zero current between time T43 and time T45.

Note that embodiments herein include adjusting the switching frequency of operating respective switches to control current 121-1. For example, in case B, the controller 140 activates the switch 151 at time T43 (instead of time T45) via signal S1H going high at time T43. This (case B) increases the switching frequency of controlling switches 151 and 152 and reduces or eliminates the gap time T43 to T45 during which the current 121-1 is otherwise zero amperes. This reduces the gap time of current 121-1 (B) of being zero amperes.

Figure 9:
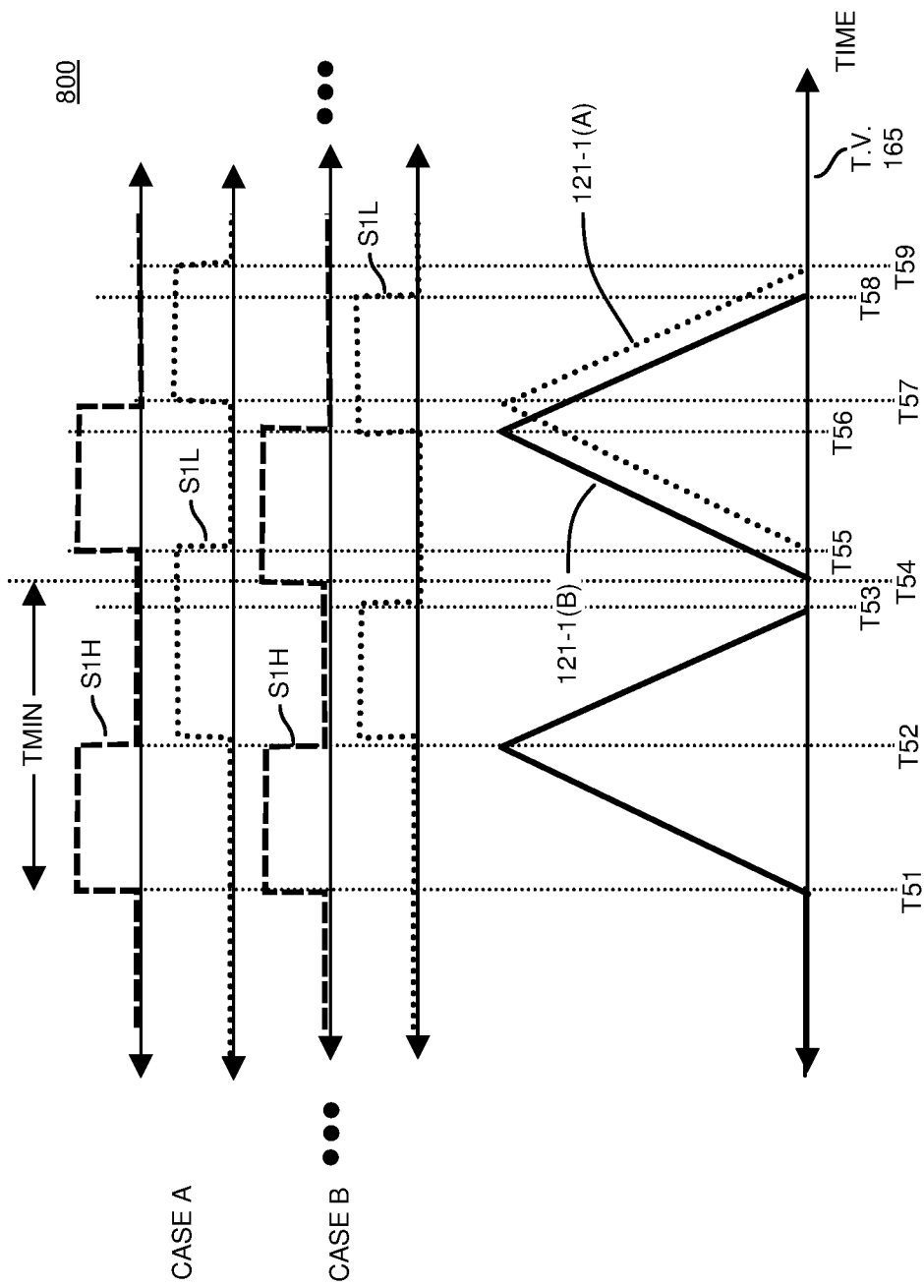
FIG. 9 is an example diagram illustrating adjustment of control signals according to embodiments herein.

FIG. 9 is an example diagram illustrating adjustment of control signals according to embodiments herein.

In this example embodiment, the controller 140 is prevented from increasing a magnitude of the switching frequency of controlling switches 151 and 152 above a respective switching frequency threshold value. For example, the switching frequency of controlling switches 151 and 152 controls a respective frequency of ripple (such as sawtooth shape) associated with the motor drive current 121-1. The controller 140 adjusts a switching frequency of producing control signals S1H and S1L.

More specifically, in response to detecting at time T53, that the magnitude of the current 121-1 crosses the threshold value 165, the controller 140 adjusts a respective switching frequency of controlling respective switches 151 and 152.

For example, as previously discussed, case A indicates a case in which there is a gap (time between T53 and T55) of no current through the winding 131-1 and no change in the switching frequency.

In case B of FIG. 9, however, the controller 140 implements a minimal time delay of TMIN (minimal switching period) in which the controller 140 is able to activate the high side switch circuitry 151 from one cycle to the next. The controller 140 applies a minimal gap delay of (T54 minus T53) between a time of terminating the flow of current (at time T53) and a subsequent time T54 of increasing the magnitude of current 121-1(B) supplied through the motor winding 131 above the threshold value 165. The minimal time TMIN prevents the controller 140 from activating the high side switch circuitry again after T53 such that the time from activating the high side switch circuitry at T51 in one cycle is not sooner than tine T54. In such an instance, the maximum switching frequency in this example is 1/TMIN.

Figure 10:
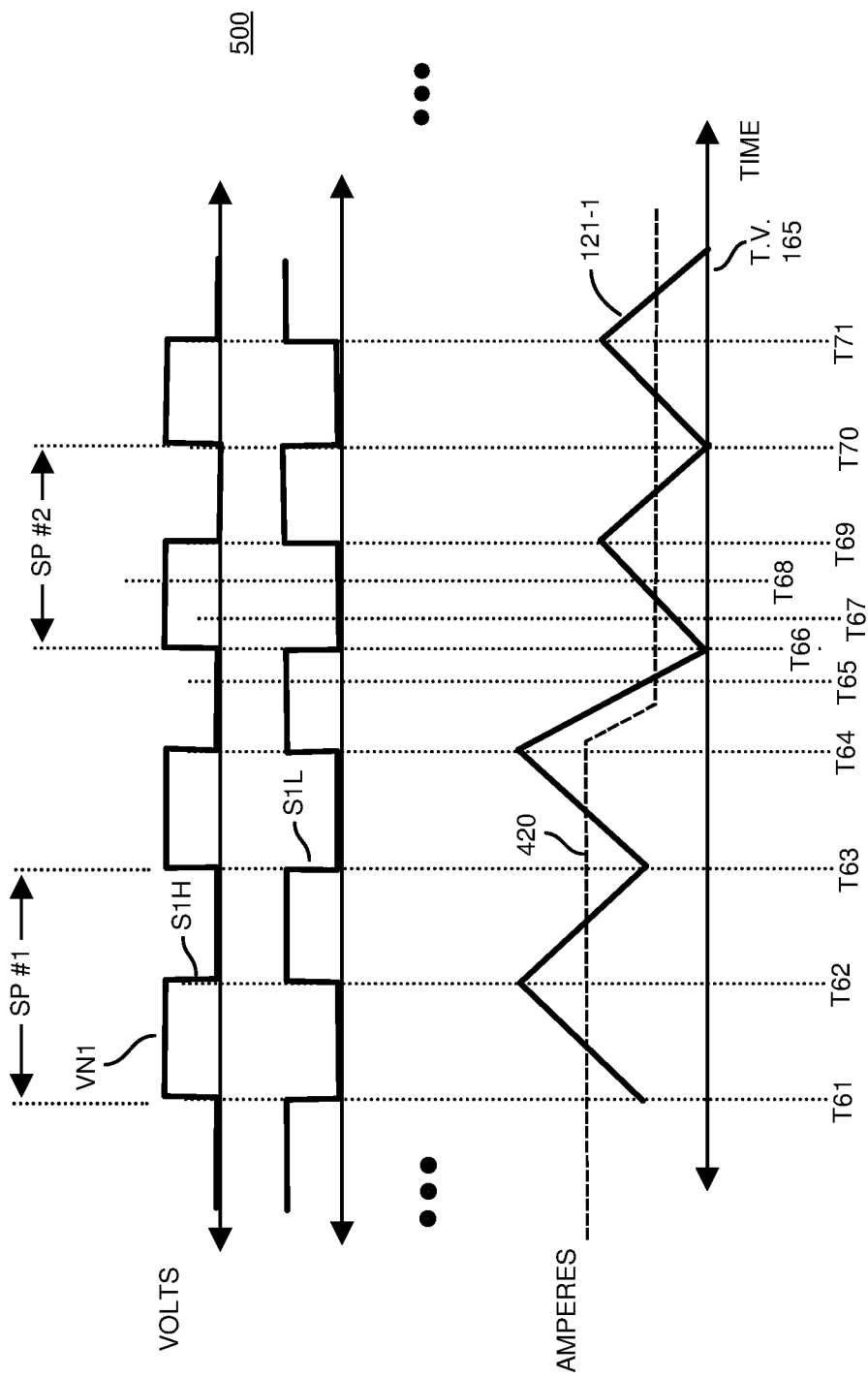
FIG. 10 is an example diagram illustrating motor current control and switching frequency adjustment according to embodiments herein.

FIG. 10 is an example diagram illustrating motor current control and switching frequency adjustment to prevent the motor winding current from falling below a threshold value according to embodiments herein.

In this example embodiment, the controller 140 operates the switches at a first switching frequency (such as 1/SP1, where SP1 represents the switching period of controlling switches 151 and 152). The controller 140 supplies average current 420 to the winding 131-1 based on control input 105 from the user 108.

At or around time T64 to T65, the motor 131 experiences a decrease in load resulting in less power delivered to the motor 131. In such an instance, the controller 140 increases a switching frequency of controlling respective switches 151 and 152 to prevent the current 121-1 from falling below the threshold value 165. For example, at or around time T65, the controller 140 switches to operation of the switches 151 and 152 at a higher switching frequency (such as 1/SP2, where SP2 represents the switching period of controlling switches 151 and 152 in a manner as previously discussed).

Figure 11:
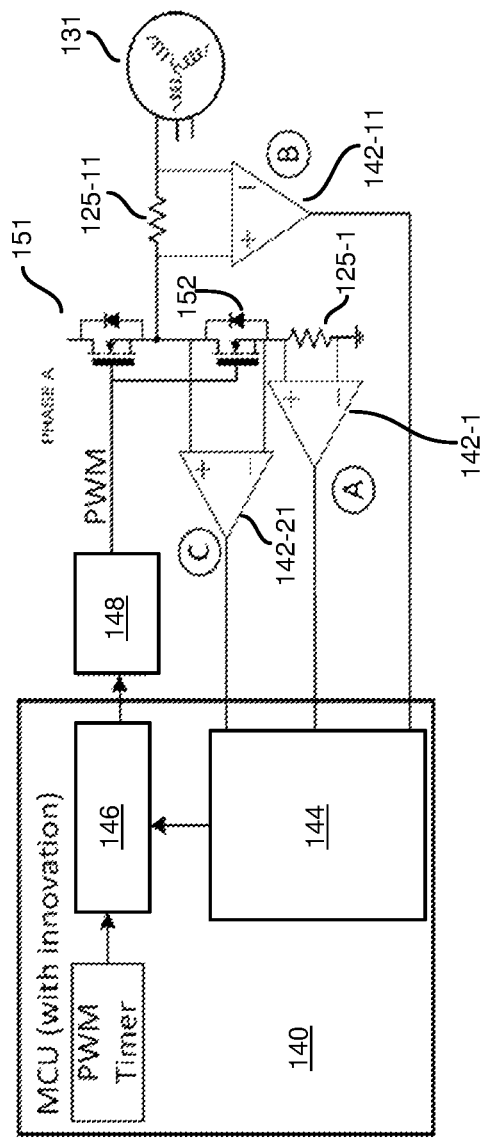
FIG. 11 is an example diagram illustrating different possible implementations of monitoring current through each of multiple motor windings according to embodiments herein.

FIG. 11 is an example diagram illustrating different possible implementations of monitoring current through each of multiple motor windings according to embodiments herein.

Note that the monitoring of the magnitude of current in each of the windings of motor 131 can vary depending on the embodiment.

For example, in one embodiment such as embodiment A, the motor system 100 implements amplifier 142-1 to amplify a magnitude of the voltage across a respective sense resistor 125-1 to determine a magnitude of the current 121-1. Thus, embodiments herein include monitoring leg shunt current during low side ON period such as if 3 shunt sensing and high side modulated PWM is applied.

In accordance with another example embodiment B, the motor system 100 implements amplifier 142-11 to amplify a magnitude of the voltage across a respective sense resistor 125-11 to determine a magnitude of the current 121-1. In such an instance, if in phase current sensing is used, the whole current information (current 121-1) is available, a comparator or an ADC in the controller 140 detects the threshold value crossing.

In accordance with another example embodiment C, the motor system 100 uses the Rdson of the low-side switch 152 to determine a magnitude of the current 121-1. The amplifier 142-21 amplifies a magnitude of the voltage across the drain-source nodes of switch 152 to determine a magnitude of the current 121-1. In such an instance, Rdson sensing of low side provides also valuable information to detect the ZCD: when the current reverses, the voltage drop on the switch 152 (Rdson) will reverse. The low-side switch 152 can be monitored if using high side modulation; high side switch 151 Rdson sensing can be used if using low side PWM modulation.

Figure 12:
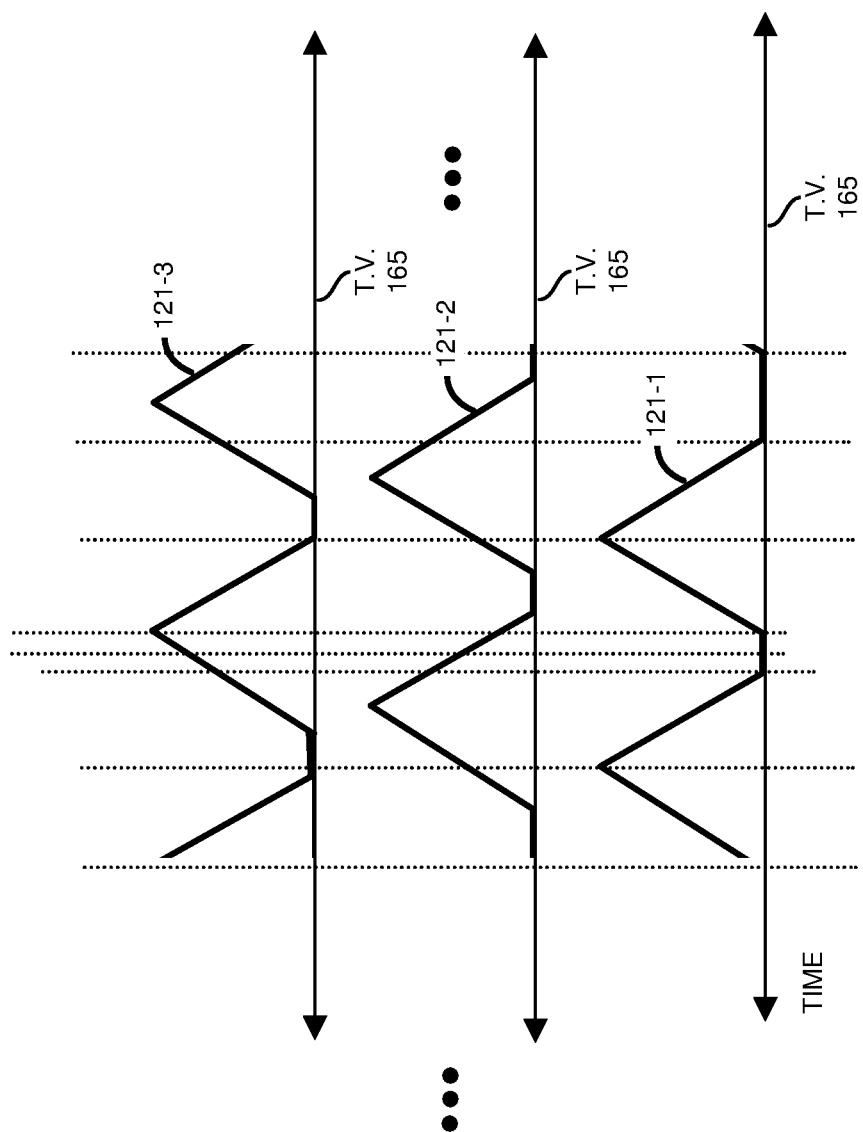
FIG. 12 is an example diagram illustrating implementation of motor winding current control in a drive according to embodiments herein.

FIG. 12 is an example diagram illustrating implementation of motor winding current control in multiple phases according to embodiments herein.

As previously discussed, in one embodiment, the respective magnitude of current through each of the motor windings in motor 131 varies over time. Additionally, or alternatively, each of the respective magnitudes of current associated with windings of motor 131 is out of phase with respect to each other.

In still further example embodiments, the controller 140 controls a flow of current through each of the multiple motor windings. For example, the controller 140 monitors first current 121-1 flowing through a first motor winding 131-1; second current 121-2 through a second motor winding 131-2; third current 121-3 through a third motor winding 131-3; and so on. In a manner as previously discussed, the controller 140 compares the first current 121-1 to the threshold value 165; the controller 140 compares the second current 121-2 to the threshold value 165; the controller 140 compares the third current 121-3 to the threshold value 165; and so on.

The controller 140 prevents each of the currents from falling below a threshold value. For example, in response to detecting that the magnitude of first current 121-1 through the first motor winding 131-1 crosses (such as equals or falls below) the threshold value 165, the controller 140 terminates a flow of the first current 121-1 through the first motor winding 121-1; in response to detecting that the magnitude of second current 121-2 through the second motor winding 131-1 crosses (such as equals or falls below) the threshold value 165, the controller 140 terminates a flow of the second current 121-2 through the second motor winding 131-2; in response to detecting that the magnitude of third current 121-3 through the third motor winding 131-3 crosses (such as equals or falls below) the threshold value 165, the controller 140 terminates a flow of the third current 121-3 through the third motor winding 131-3; and so on.

Figure 13:
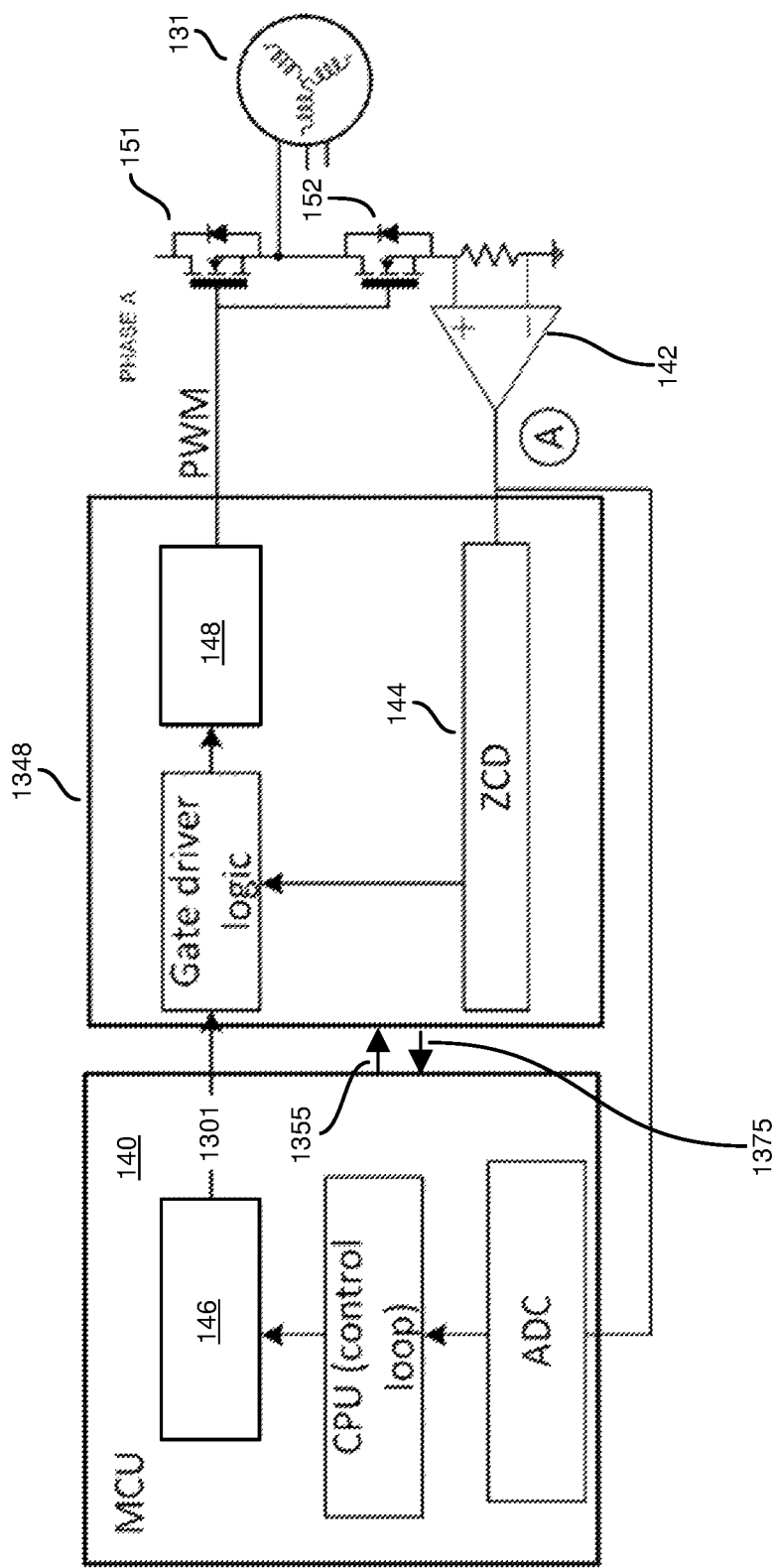
FIG. 13 is an example diagram illustrating of monitoring and controlling current through multiple windings via a gate driver module implementing control functionality according to embodiments herein.

FIG. 13 is an example diagram illustrating of a gate driver that monitors and controls current through multiple windings according to embodiments herein.

This is a possible block diagram implementation of a block commutated 3 phase inverter (assuming 3 leg shunt as in FIG. 2) with this innovation.

In this case, the gate driver module (such as a semiconductor chip or other suitable hardware) includes integration of the TCD (Threshold Crossing Detection) functionality and directly switches off a respective low side switch of a phase when the crossing is detected on that phase. The gate driver module 1348 (such as logic) identifies which PWM control signal and low-side switch must be deactivated if only a single TCD input is available or it can include 3 TCD inputs, one dedicated for each winding leg. This depends on the particular PWM modulation used, for example high side or low side modulation.

Thus, embodiments herein include implementing all or a portion of the functionality associated with controller 140 as a switch driver (gate driver module 1348). For example, in one embodiment, the switch driver (gate driver module 1348) receives a pulse width modulation control signal 1301 indicating a control state to apply to a switch 152 that controls the flow of current 121-1 through the motor winding 131-1. In a manner as previously discussed, the comparator 144 monitors the magnitude of motor winding current 121-1 and adjusts the received pulse width modulation control signal 1301 based on the comparison of the magnitude of current to the threshold value 165. In one embodiment, the switch driver adjustment implemented by the gate driver module 1348 (switch driver) prevents the magnitude of the current 121-1 though the motor winding 131-1 from falling below the threshold value 165.

In one embodiment, the gate driver module 1348 controls current through each of the multiple windings in a manner as previously discussed with respect to the first winding 131-1.

In yet further example embodiments, the controller 140 generates the control signal 1355 and transmits it to the gate driver module 1348. The control signal 1355 controls whether the gate driver module 1348 implements low-side switch shut off in response to detecting respective current crossing the threshold value 165 in a manner as previously discussed.

In further example embodiments, the gate driver module 1348 provides the controller 140 with control adjustment information 1375 implemented by the gate driver module 1348 controlling each of the multiple winding currents. As its name suggests, the control adjustment information 1375 indicates pulse width modulation control signal adjustments and timing implemented by the gate driver module 1348 with respect to original pulse width modulation signals 1301 generated by the controller 140. Accordingly, the gate driver module 1348 notifies the controller 140 of operating conditions associated with controlling the currents 121-1, 121-2, etc.

Figure 14:
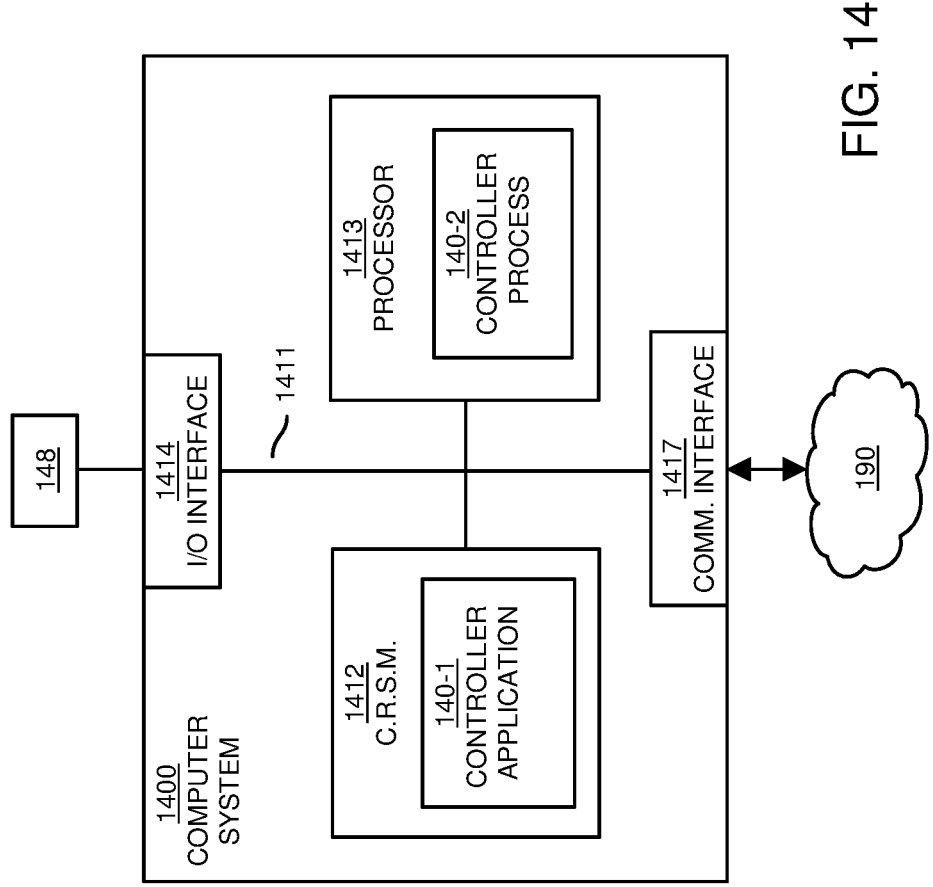
FIG. 14 is an example diagram illustrating computer processor hardware and related software instructions that execute methods according to embodiments herein.

FIG. 14 is an example block diagram of a computer device for implementing any of the operations as discussed herein according to embodiments herein.

As shown, computer system 1400 (such as implemented by any of one or more resources such as controller 140, monitor 142, comparator 144, signal generator 146, etc.) of the present example includes an interconnect 1411 that couples computer readable storage media 1412 such as a non-transitory type of media (or hardware storage media) in which digital information can be stored and retrieved, a processor 1413 (e.g., computer processor hardware such as one or more processor devices), I/O interface 1414, and a communications interface 1417.

I/O interface 1414 provides connectivity to any suitable circuitry such as driver 148, switch 120, etc.

Computer readable storage medium 1412 can be any hardware storage resource or device such as memory, optical storage, hard drive, floppy disk, etc. In one embodiment, the computer readable storage medium 1412 stores instructions and/or data used by the controller application 140-1 to perform any of the operations as described herein.

Further in this example embodiment, communications interface 1417 enables the computer system 1400 and processor 1413 to communicate over a resource such as network 190 to retrieve information from remote sources and communicate with other computers.

As shown, computer readable storage media 1412 is encoded with controller application 140-1 (e.g., software, firmware, etc.) executed by processor 1413. Controller application 140-1 can be configured to include instructions to implement any of the operations as discussed herein.

During operation of one embodiment, processor 1413 accesses computer readable storage media 1412 via the use of interconnect 1411 in order to launch, run, execute, interpret or otherwise perform the instructions in controller application 140-1 stored on computer readable storage medium 1412.

Execution of the controller application 140-1 produces processing functionality such as controller process 140-2 in processor 1413. In other words, the controller process 140-2 associated with processor 1413 represents one or more aspects of executing controller application 140-1 within or upon the processor 1413 in the computer system 1400.

In accordance with different embodiments, note that computer system 1400 can be a micro-controller device, logic, hardware processor, hybrid analog/digital circuitry, etc., configured to control a power supply and perform any of the operations as described herein.

Functionality supported by the different resources will now be discussed via flowchart 1500 in FIG. 15. Note that the steps in the flowcharts below can be executed in any suitable order.

FIG. 15 is an example diagram illustrating a method of controlling a power converter according to embodiments herein.

In processing operation 1510 of flowchart 1500, the controller 140 and corresponding components monitor a magnitude of current 121-1 supplied through a motor winding 131-1.

In processing operation 1520, the controller compares the magnitude of current 121-1 to a threshold value 165.

In processing operation 1530, in response to detecting that the magnitude of current 121-1 crosses the threshold value 165, the controller 140 terminates a flow of current 121-1 through the motor winding 131.

FIG. 16 is an example diagram illustrating assembly of a motor control system and related components on one or more circuit boards according to embodiments herein.

In this example embodiment, assembler 1640 receives a substrate 1610 and corresponding components of motor system 100 such as one or more of controller 140, monitor 142, comparator 144, signal generator 146, driver 148, etc. The assembler 1640 affixes (couples) the controller 140 and other components such as monitor 142, comparator 144, signal generator 146, driver 148, etc., to the substrate 1610.

Via respective circuit paths as described herein, the fabricator 1640 provides connectivity between the controller 140 and corresponding components. Note that components such as the controller 140, monitor 142, comparator 144, signal generator 146, driver 148, etc., can be affixed or coupled to the substrate 1610 in any suitable manner. For example, one or more of the components in motor system 100 can be soldered to the substrate 1610, inserted into sockets disposed on the substrate 1610, etc.

Note further that the substrate 1610 is optional. Any of one or more circuit paths or connectivity as shown in the FIGS. and as described herein can be disposed in cables or other suitable medium.

In one nonlimiting example embodiment, the motor 131 is disposed on its substrate or no substrate independent of substrate 1610; the substrate of the motor 131 is directly or indirectly connected to the substrate 1610 via wires, cables, links, etc. The controller 140 or any portion of the motor system 100 can be disposed on a standalone smaller board plugged into a socket of the substrate 1610 as well.

Via one or more circuit paths 1622 (such as one or more traces, cables, connectors, wires, conductors, electrically conductive paths, etc.), the assembler 1640 couples the motor system 100 and corresponding components to the motor 131. In one embodiment, the circuit path 1622 conveys the current from one or more drivers 148 to different windings 131-1, 131-2, 131-3, etc., of the motor 131.

Accordingly, embodiments herein include a system comprising: a substrate 1610 (such as a circuit board, standalone board, mother board, standalone board destined to be coupled to a mother board, host, etc.); and a motor system 100 including corresponding components as described herein; and a motor 131 (such as a motor, winding, etc.).

Note again that techniques herein are well suited for use in circuit applications such as those that controlling current through one or more motor windings. However, it should be noted that embodiments herein are not limited to use in such applications and that the techniques discussed herein are well suited for other applications as well.

Based on the description set forth herein, numerous specific details have been set forth to provide a thorough understanding of claimed subject matter. However, it will be understood by those skilled in the art that claimed subject matter may be practiced without these specific details. In other instances, methods, apparatuses, systems, etc., that would be known by one of ordinary skill have not been described in detail so as not to obscure claimed subject matter. Some portions of the detailed description have been presented in terms of algorithms or symbolic representations of operations on data bits or binary digital signals stored within a computing system memory, such as a computer memory. These algorithmic descriptions or representations are examples of techniques used by those of ordinary skill in the data processing arts to convey the substance of their work to others skilled in the art. An algorithm as described herein, and generally, is considered to be a self-consistent sequence of operations or similar processing leading to a desired result. In this context, operations or processing involve physical manipulation of physical quantities. Typically, although not necessarily, such quantities may take the form of electrical or magnetic signals capable of being stored, transferred, combined, compared or otherwise manipulated. It has been convenient at times, principally for reasons of common usage, to refer to such signals as bits, data, values, elements, symbols, characters, terms, numbers, numerals or the like. It should be understood, however, that all of these and similar terms are to be associated with appropriate physical quantities and are merely convenient labels. Unless specifically stated otherwise, as apparent from the following discussion, it is appreciated that throughout this specification discussions utilizing terms such as "processing," "computing," "calculating," "determining" or the like refer to actions or processes of a computing platform, such as a computer or a similar electronic computing device, that manipulates or transforms data represented as physical electronic or magnetic quantities within memories, registers, or other information storage devices, transmission devices, or display devices of the computing platform.

While this invention has been particularly shown and described with references to preferred embodiments thereof, it will be understood by those skilled in the art that various changes in form and details may be made therein without departing from the spirit and scope of the present application as defined by the appended claims. Such variations are intended to be covered by the scope of this present application. As such, the foregoing description of embodiments of the present application is not intended to be limiting. Rather, any limitations to the invention are presented in the following claims.

The invention claimed is:

1. An apparatus comprising:
a controller operative to:
monitor a magnitude of current supplied through a first motor winding of a motor, the first motor winding electrically coupled to at least a second motor winding in the motor;
compare the magnitude of current through the first motor winding to a threshold value; and
in response to detecting the magnitude of current crossing the threshold value, terminate a flow of the current through the first motor winding, termination of the flow of current preventing the magnitude of current through the first motor winding from falling below the threshold value;
wherein the first motor winding is electrically coupled in series with the second motor winding via connectivity;
wherein the controller is further operative to:
monitor a magnitude of current supplied through the second motor winding;
compare the magnitude of current through the second motor winding to the threshold value; and
in response to detecting that the magnitude of current through the second motor winding crosses the threshold value, terminate a flow of the current through the second motor winding.

2. The apparatus as in claim 1, wherein the threshold value corresponds to a polarity change condition associated with the magnitude of current through the first motor winding; and
wherein termination of the flow of current through the first motor winding prevents the current from reversing direction through the first motor winding.

3. The apparatus as in claim 1, wherein the termination of the flow of current through the first motor winding includes deactivation of low side switch circuitry electrically connecting the first motor winding to a reference voltage.

4. The apparatus as in claim 1, wherein the controller is operative to:
activate a first switch coupled to the first motor winding to increase the magnitude of the current though the first motor winding; and
activate a second switch coupled to the first motor winding to decrease the magnitude of the current through the first motor winding; and
deactivate both the first switch and the second switch to terminate the flow of current, the second switch deactivated in response to detecting that the magnitude of current crosses the threshold value.

5. The apparatus as in claim 1, wherein the threshold value corresponds to substantially zero amperes of current flowing through the first motor winding.

6. The apparatus as in claim 1, wherein the controller is operative to adjust a switching frequency of controlling the flow of current through the first motor winding responsive to detection of a condition in which the magnitude of the current through the first motor winding crosses the threshold value.

7. The apparatus as in claim 1, wherein the controller is operative to detect that the magnitude of the current through the first motor winding crosses the threshold value while the magnitude of the current supplied through the first motor winding is decreasing.

8. The apparatus as in claim 7, wherein the controller is operative to increase the flow of current through the first motor winding subsequent to the termination of the flow of current.

9. The apparatus as in claim 1, wherein the controller includes a switch driver operative to receive a pulse width modulation control signal indicating a state of a switch that controls the flow of current through the first motor winding, the switch driver operative to adjust the received pulse width modulation control signal based on the comparison of the magnitude of current to the threshold value and prevent the magnitude of the current though the first motor winding from falling below the threshold value.

10. The apparatus as in claim 1, wherein the current supplied through the first motor winding is a variable magnitude current out of phase with respect to the current supplied through the second motor winding.

11. The apparatus as in claim 1, wherein the controller is further operative to implement a minimal delay between a time of terminating the flow of current through the first motor winding and a time of increasing the magnitude of current supplied through the first motor winding above the threshold value.

12. A system comprising:
a circuit substrate;
the apparatus of claim 1, the apparatus coupled to the circuit substrate; and
wherein the load is coupled to the substrate.

13. A method comprising:
receiving a circuit substrate; and
coupling the apparatus of claim 1 to the circuit substrate.

14. The apparatus as in claim 1, wherein the first motor winding is electrically coupled to the second motor winding and a third motor winding via connectivity in the motor.

15. The apparatus as in claim 14, wherein the controller is further operative to prevent a respective magnitude of current through each of the second motor winding and the third motor winding from falling below the threshold value.

16. The apparatus as in claim 14, wherein the threshold value corresponds to a polarity change condition associated with the magnitude of current through the first motor winding; and
wherein termination of the flow of current through the first motor winding prevents the current from reversing direction through the first motor winding.

17. The apparatus as in claim 14, wherein the threshold value corresponds to substantially zero amperes of current flowing through the first motor winding.

18. The apparatus as in claim 17, wherein the controller is operative to adjust a switching frequency of controlling the flow of current through the first motor winding responsive to detection of a condition in which the magnitude of the current through the first motor winding crosses the threshold value.

19. The apparatus as in claim 1, wherein the controller is operative to detect that the magnitude of the current crosses the threshold value while monitoring a decrease in the magnitude of the current supplied through the first motor winding.

20. A method comprising:
monitoring a magnitude of current supplied through a first motor winding of a motor, the first motor winding electrically coupled to at least a second motor winding in the motor, the first motor winding electrically coupled in series with the second motor winding via connectivity;

comparing the magnitude of current through the first motor winding to a threshold value; and in response to detecting that the magnitude of current crosses the threshold value, terminating a flow of current through the first motor winding, termination of the flow of current preventing the magnitude of current through the first motor winding from falling below the threshold value;

the method further comprising: i) activating first switch circuitry to increase the magnitude of the current through the first winding during a first portion of a first control cycle of controlling the current through the first motor winding; ii) activating second switch circuitry to decrease a magnitude of the current supplied to the first winding during a second portion of the first control cycle; and iii) deactivating the second switch circuitry in a third portion of the first control cycle in response to detecting that the magnitude of current through the first motor winding decreases to the threshold value.

21. The method as in claim 20, wherein the threshold value corresponds to a polarity change condition associated with the magnitude of current through the first motor winding; and wherein terminating the flow of current through the first motor winding prevents the current from reversing direction through the first motor winding.

22. The method as in claim 20, wherein termination of the flow of current through the first motor winding includes deactivation of switch circuitry electrically connecting the first motor winding to a reference voltage.

23. The method as in claim 20, wherein the threshold value corresponds to a flow of substantially zero amperes of current through the first motor winding.

24. The method as in claim 20 further comprising:
adjusting a switching frequency of controlling the current through the first motor winding responsive to detecting that the magnitude of the current crosses the threshold value.

25. The method as in claim 20 further comprising:
terminating the flow of current through the first motor winding as the magnitude of the current supplied through the first motor winding is decreasing.

26. The method as in claim 25 further comprising:
increasing the flow of current through the first motor winding subsequent to the termination of the flow of current.

27. The method as in claim 20 further comprising:
receiving a pulse width modulation control signal controlling the flow of current through the first motor winding; and adjusting the received pulse width modulation control signal based on a comparison of the magnitude of current to the threshold value, adjustment of the pulse width modulation control signal preventing the magnitude of the current though the first motor winding from falling below the threshold value.

28. The method as in claim 20 further comprising:
monitoring a magnitude of current supplied through the second motor winding;

comparing the magnitude of current through the second motor winding to the threshold value; and in response to detecting that the magnitude of current through the second motor winding crosses the threshold value, terminating a flow of the current through the second motor winding.

29. The method as in claim 28, wherein the current supplied through the first motor winding is a varying current out of phase with respect to the current supplied through the second motor winding.

30. The method as in claim 20 further comprising:
implementing a minimal delay between a time of terminating the flow of current and a time of increasing the magnitude of current supplied through the first motor winding above the threshold value.

31. An apparatus comprising:
a controller operative to:
monitor a magnitude of current supplied through a first motor winding of a motor, the first motor winding electrically coupled to at least a second motor winding in the motor;

compare the magnitude of current through the first motor winding to a threshold value; and in response to detecting the magnitude of current crossing the threshold value, terminate a flow of the current through the first motor winding, termination of the flow of current preventing the magnitude of current through the first motor winding from falling below the threshold value;

wherein the controller is further operative to: i) activate first switch circuitry to increase the magnitude of the current through the first winding during a first portion of a first control cycle of controlling the current through the first motor winding; ii) activate second switch circuitry to decrease the magnitude of the current supplied to the first winding during a second portion of the first control cycle; and iii) deactivate the second switch circuitry in a third portion of the first control cycle in response to detecting that the magnitude of the current through the first motor winding decreases to the threshold value.

32. The apparatus as in claim 31, wherein the controller is operative to adjust a magnitude of a delay between the deactivating of the second switch circuitry and activating the first switch circuitry again, the adjusted magnitude of the delay setting a switching frequency of controlling the current through the first motor winding.

33. The apparatus as in claim 31, wherein the controller is further operative to: i) activate third switch circuitry to increase a magnitude of current supplied to the second winding during a first portion of a second control cycle of controlling the current through the second motor winding; ii) activate fourth switch circuitry to decrease a magnitude of the current supplied to the second winding during a second portion of the second control cycle; and iii) deactivate the fourth switch circuitry in a third portion of the second control cycle in response to detecting that the magnitude of current through the second motor winding decreases to the threshold value.

* * * * *